Nov. 4, 1958

B. R. JEREMIAS 2,859,144

PROCESS AND COMPOSITION FOR PROTECTIVELY
COATING ALUMINUM AND ALUMINUM ALLOYS

Filed Aug. 27, 1954

INVENTOR:
BRUNO R. JEREMIAS
BY
Marzall, Johnston, Cook & Root
ATT'YS

United States Patent Office 2,859,144
Patented Nov. 4, 1958

2,859,144

PROCESS AND COMPOSITION FOR PROTECTIVELY COATING ALUMINUM AND ALUMINUM ALLOYS

Bruno R. Jeremias, Chicago, Ill., assignor to Poor & Company, Chicago, Ill., a corporation of Delaware Application August 27, 1954, Serial No. 452,699

12 Claims. (Cl. 148—6.2)

The present invention relates to a process and a composition for protectively coating aluminum and aluminum alloys. The term "aluminum alloy" is used herein to mean an alloy of aluminum with one or more other metals in which aluminum is the principal ingredient.

One of the objects of the invention is to provide a new and improved process for treating aluminum and aluminum alloys which results in a protective coating having high corrosion resistance.

Another object is to provide compositions for treating aluminum and aluminum alloys which provide a protective coating capable of serving as a base for paint or other similar organic finishes.

An additional object of the invention is to provide a new and improved corrosion resistant and paint receptive aluminum and aluminum alloys. Other objects will appear hereinafter.

In accomplishing these objects in accordance with this invention it has been found that new and improved results in protecting aluminum and aluminum alloys against corrosion are obtained by coating the aluminum with a solution containing chromic acid ($CrO_3$), a water soluble dichromate and fluoboric acid as the essential ingredients. The coating solution can also contain certain auxiliary ingredients as hereinafter more fully described.

In the practice of the invention it is preferable to prepare the chromic acid and water soluble dichromate in one solution and the fluoboric acid in a separate solution. Examples of such solutions are:

| Ingredient: | Proportion, grams per liter |
|---|---|
| Composition A— | |
| $Na_2Cr_2O_7 \cdot 2H_2O$ | 240 |
| $CrO_3$ | 48 |
| Water sufficient to make a liter of solution. | |
| Composition B— | |
| $HBF_4$ (47% solution in water) | 330 |
| $NH_4Cl$ | 7.5 |
| Water sufficient to make a liter of solution. | |

The above described solutions may be considered as concentrates suitable for use in preparing solutions that are actually employed in coating the aluminum or aluminum alloys. Compositions A and B are separately prepared because if they are mixed together in their concentrated forms precipitation of an insoluble substance of unknown composition occurs.

The final composition for coating the aluminum or aluminum alloys is prepared by adding Composition A and Composition B to a large volume of water. For example, the final composition can contain 1½% to 2½% by volume of Composition A and ¾% by volume of Composition B, dissolved in water.

In evaluating the invention, it has been found that there is a critical relationship between the various essential active components of the composition and especially between the fluoboric acid and the chromium present in the coating solution. The criticality varies somewhat depending upon the type of aluminum material being treated. Thus, the relative proportions are generally less critical in coating aluminum alloys such as 2S and 3S than in coating alloys such as 24S, 75S and 61S.

The general methods of evaluation heretofore employed in the industry to test the protective effect of coatings on aluminum and aluminum alloys have usually been salt spray tests, humidity tests and paintability tests. In evaluating the present invention, however, it has been found that the amount of deposited chromium on the surface of the aluminum or aluminum alloy in terms of milligrams per square foot is also a definite criterion of the protection against corrosion afforded by the coating. It has been found, moreover, that in the practice of the present invention the relative proportion of fixed chromium to soluble chromium deposited on the aluminum or aluminum alloys is high. A feature of the present invention is the preparation of aluminum and aluminum alloys coated with chromium and containing in excess of 20, preferably between 20 and 40 milligrams per square foot of total chromium with the fixed chromium predominating.

The invention will be further illustrated by reference to the following examples in conjunction with the accompanying drawings in which.

Example I

Figure 1:
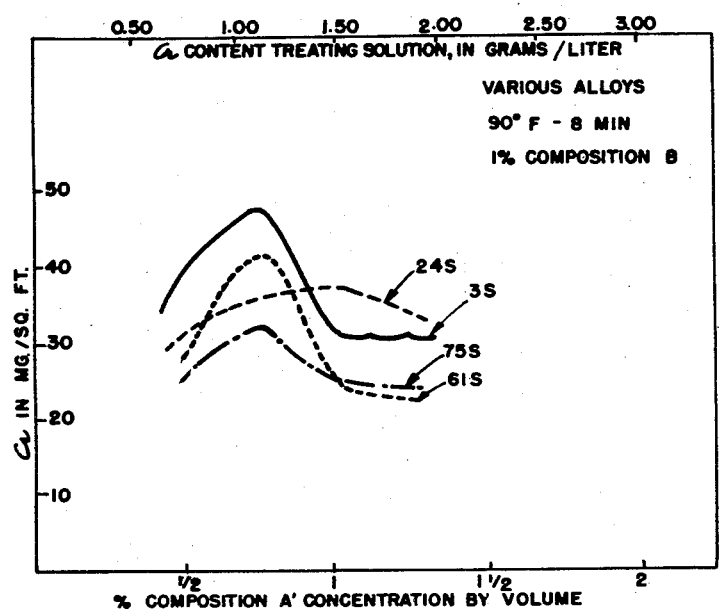
Fig. 1 illustrates graphically the results obtained in coating various alloys with chromium in accordance with the invention.

In the drawings, Fig. 1 illustrates the deposition of chromium on various alloys using a coating solution containing 1% by volume of Composition B and various proportions of Composition A' composed of 240 grams per liter of $Na_2Cr_2O_7 \cdot 2H_2O$, 120 grams per liter of $CrO_3$ and the remainder water.

Each alloy was immersed in the coating solution at a temperature of 90° F. for 8 minutes and was thereafter rinsed in cold water.

It will be observed that in this example the concentration of Composition A' varied from about ½% by volume to about 1.25% by volume and the chromium content of the treating solution varied from about .75 gram per liter, expressed as Cr, to about 2 grams per liter.

The alloy designated 3S is an aluminum alloy containing approximately 98.8% aluminum by weight and 1.2% by weight manganese.

The alloy designated 24S consists essentially of 4.5% by weight copper, 0.6% by weight manganese, 1.5% by weight magnesium and the remainder aluminum.

The alloy designated 61S consists essentially of 0.6% by weight silicon, 0.25% by weight copper, 1.0% by weight magnesium, 0.25% by weight chromium and the remainder aluminum.

The alloy designated 75S consists essentially of 1.6% by weight copper, 2.5% by weight magnesium, 0.3% by by weight chromium, 5.6% by weight zinc and the remainder aluminum.

It is particularly significant to note that the amount of chromium deposited on the surface of the alloy was between 30 and 40 milligrams per square foot in the case of 24S, and in all cases the amount of chromium deposited was in excess of 20 milligrams per square foot. The alloys containing copper, and especially 24S and 75S, are particularly difficult to coat with chromium and it is believed that the invention provides for the first time a process and composition for coating such alloys with amounts of chromium in excess of 20 milligrams per square foot merely by dipping them in the chromium solution.

*Example II*

Figure 2:
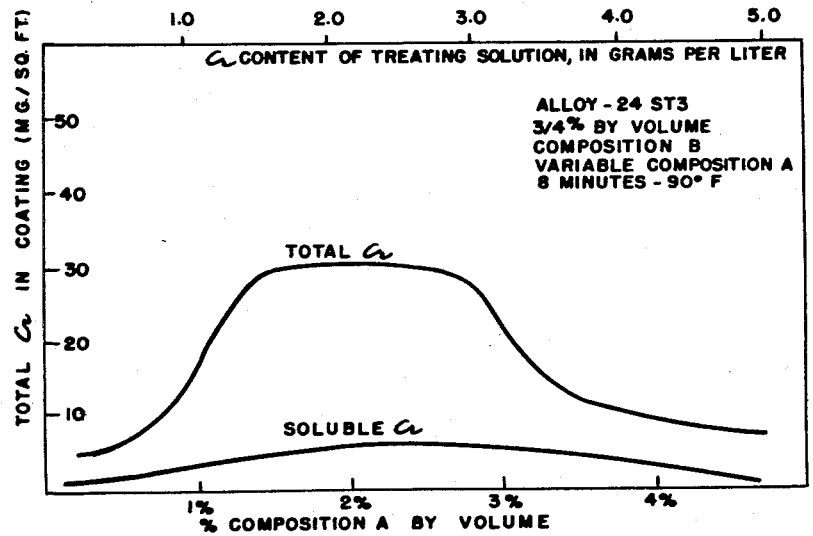
Figs. 2 and 3 illustrate the results obtained in coating specific types of alloys with various compositions in accordance with the practice of the invention.

Fig. 2 of the drawings illustrates the results obtained on an aluminum alloy designated 24ST3 (tempered 24S) using a coating solution containing ¾% by volume of Composition B and variable proportions of Composition A at 90° F. for 8 minutes and then rinsing in cold water. The graphs show that the total chromium deposited reaches a maximum between 1.5% and 2.5% by volume Composition A. The amount of soluble chromium deposited is less than about 6 milligrams per square foot of surface area. In the range where the chromium content of the treating solution is between about 1.1 and about 3.2 grams per liter, the amount of chromium deposited is in excess of 20 milligrams per square foot.

*Example III*

Figure 3:
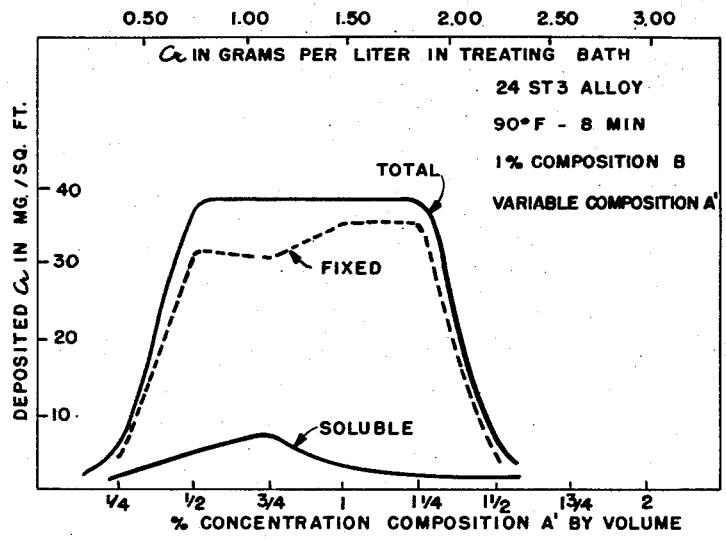

Fig. 3 of the drawings illustrates the results obtained by immersing an aluminum alloy 24ST3 (24S heat treated and cold worked) in a coating solution made by dissolving 1% by volume of Composition B and various concentrations of Composition A' of Example I in water, at 90° F. for 8 minutes and then rinsing with cold water. The total amount of chromium deposited is shown by the top graph, the amount of fixed chromium deposited is shown by the dotted line graph and the amount of soluble chromium deposited is shown by the lower graph.

It will be observed that the relative proportions of Composition A' can vary within a range of .375% to 1.375% and still obtain a chromium deposit in excess of 20 milligrams per square foot. In the optimum range of ½% by volume of Composition A' to 1¼% by volume of Composition A' an optimum chromium deposition of approximately 38 milligrams per square foot is obtained. In all cases the relative proportion of fixed chromium deposited is much higher than that of soluble chromium deposited.

*Example IV*

Figure 4:
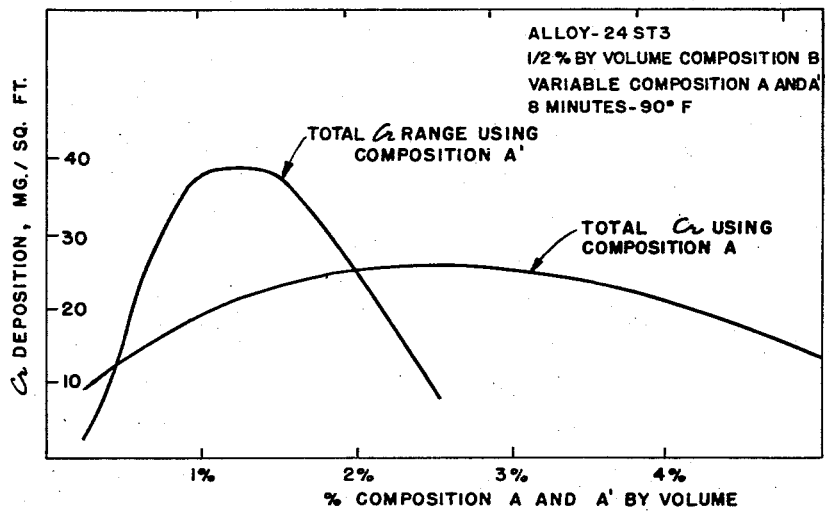
Fig. 4 illustrates the comparative results obtained on a given aluminum alloy with varying proportions of two different dichromate-chromic acid solutions employed in accordance with the invention.

Fig. 4 of the drawings illustrates the results obtained by immersing aluminum alloy 24ST3 for 8 minutes at 90° F. in various coating compositions prepared from Composition A' (Example I) and Composition A mixed in various proportions with ½% by volume of Composition B. In each instance, the test pieces were rinsed with cold water and the deposition of chromium in milligrams per square foot was determined.

Composition A and Composition A' both contained 240 grams per liter of sodium dichromate. Composition A' contains 120 grams per liter of chromic acid while Composition A contains 48 grams per liter of chromic acid. It is apparent that the range of concentrations of Composition A' is much more critical for the same amount of fluoboric acid than is the range of concentrations of Composition A.

In general, the higher the concentration of fluoboric acid in the coating solution the more critical is the concentration of chromium in the bath. For example, using Composition A' consisting of 240 grams per liter of sodium dichromate and 120 grams per liter of chromic acid dissolved in water, chromium deposition on aluminum alloy 24ST3 in excess of 20 milligrams per square foot can be obtained from a coating solution made by dissolving ⅝% to 2¼% by volume of Composition A' and ½% by volume of Composition B in water and immersing the alloy for 8 minutes at 90° F. If the concentration of Composition B is increased to 1% by volume in the same solution, the concentration of Composition A' should be within the range of ⅜% by volume to 1⅜% by volume. If the concentration of Composition B is increased to 2% by volume of the coating solution, the concentration of Composition A' should be within the range of 7/16% by volume to 13/16% by volume. In this last mentioned very restricted range, however, at around ⅝% by volume of Composition A', an optimum deposition of about 45 milligrams of chromium per square foot of surface is obtained.

While the invention is not limited to any theory it is believed that when the surface of aluminum alloy or aluminum is immersed in an acidified dichromate or chromic acid solution within a specific range of composition, the aluminum begins to dissolve and the pH at the interface begins to rise. At some definite, but unknown pH, a film of chromium chromates and chromium oxides and hydroxides is precipitated on the surface. The chromium exists both as soluble hexavalent chromium and insoluble trivalent chromium, the ratio between the two types of chromium being important both as to protection and appearance.

Upon drying, partial dehydration occurs and the film sets into an adherent, rather flexible coating, the color as well as the thickness depending upon composition, time of immersion, and temperature of treating solution.

The soluble hexavalent chromium chromates are brown in color and soluble in hot water before the film is dehydrated and set. While it has heretofore been thought that this source of chromium provided the protection, it is now believed as a result of the present invention, that the trivalent chromium content of the film is not only of equal importance but more stable and more compatible with paint and other subsequent coatings. The present invention makes it possible to deposit much more insoluble trivalent chromium than soluble hexavalent chromium on aluminum surfaces.

Independent tests have indicated than the corrosion resistance of the resultant coated aluminum and aluminum alloys when tested in salt spray and in humidity cabinets is far in excess of any commercial or governmental requirements.

The coating compositions employed in the practice of the invention produce a finish on aluminum and aluminum alloys which varies in color from colorless to a golden yellow, according to immersion time. The color depends also on the type of alloy. With an immersion time of about 2 to 10 minutes the coating solution can contain, for example, 1½% by volume of Composition A and ¾% by volume of Composition B dissolved in water.

In general, when a colorless film is desired, immersion time should be about 15 to about 45 seconds. When a yellow film is desired the immersion time should be from about 2 to about 10 minutes.

During the coating treatment it is desirable to maintain slow mechanical agitation of the parts or air agitation of the solution.

The temperature during the coating treatment is preferably within the range of 80 to 100° F., the optimum temperature being around 90° F.

The coating solution bath is maintained by pH determination and analysis for Composition A and Composition B. Since Composition A contains the chromates, an analysis for hexavalent chromium compared with the analysis in the fresh bath shows how much of Composition A to add during the processing. For instance, the chromium content in a freshly made bath containing 1½% by volume of Composition A is 1.64 grams per liter of chromium. After a period of processing, if the analysis of the bath shows 1.49 grams per liter of hexavalent chromium approximately 10% of the original Composition A should be added. Composition B is spent only by dragout. Ordinarily, the addition of about one part of Composition B for each 5 parts of Composition A will maintain a good performance.

After Compositions A and B are added, the pH is determined and, if necessary, enough nitric acid is added to restore the original pH of the solution. Additions in relative proportions of 250 cc. of Composition A, 50 to 66 cc. of Composition B and 50 cc. of concentrated nitric acid are considered to be average after processing 1000 square feet of surface of aluminum or aluminum alloy. Depending upon the size of the tank, these additions should be made in small quantities.

As will be apparent from the previous explanation and description in connection with the drawings, the amount of the dichromate-chromic acid solution can vary considerably and still produce a coating containing maximum quantities of chromium for corrosion protection. The percentage of the fluoboric acid solution can also vary but, as will be seen from the graphs, the coating range is decreased as the concentration of fluoboric acid is increased. Inasmuch as the fluoboric acid solution is used up mainly by dragout, the coating solution can be initially prepared at a concentration of $\frac{1}{2}$ to $\frac{3}{4}\%$ by volume of Composition B and maintained there by adjusting for dragout loss.

The pH of the coating solution is preferably around 1.6 to 2.1. Below a pH of 1.3 the color obtained is very weak but the pH can go as high as 2.5. The upper limit is also determined by the weakness of the color.

The ratio of dichromate to chromic acid has an effect on the tightness of the chromium film, especially on certain alloys, for example, 24S. The optimum weight ratio of chromium in $Na_2Cr_2O_7.2H_2O$ to chromium in $CrO_3$ is around $3\frac{1}{3}:1$.

Whether or not both the dichromate and chromic acid are used in making the coating solution depends to some extent upon the type of aluminum to be treated. On 2S (99% aluminum) and 3S the coating solution can be prepared with dichromate alone as the source of the chromium or with chromic acid alone as the source of the chromium. On alloys containing copper, for example, 24S, the chromium coating is weak and thin when the coating solution contains no chromic acid, and it is dusty when the chromic acid contains no dichromate. In general, the best results on aluminum and aluminum alloys are obtained with coating solutions in which the weight ratio of chromium in the dichromate to chromium in the chromic acid is within the range of 10:1 to 1:4.

Fluoboric acid apparently acts as a catalyst. The same result is not obtained with other fluorine-containing compounds such as trifluoroacetic acid. The mol ratio of $HBF_4$ to $CrO_3$ is preferably within the range of a minimum of 1:16 to a maximum of 2:1, and the optimum is around 1:2 to 1:3. The optimum weight ratio of $HBF_4$ to chromic acid is approximately 1:2 to 1:5.

The ammonium chloride employed in Composition B in the foregoing examples adds to the strength of the film. It can be omitted from the composition but by its use a stronger film is obtained. The amount of the ammonium chloride has some effect on the deposition of chromium. Thus, in a given solution when the per cent of ammonium chloride, calculated on the total weight of fluoboric acid and ammonium chloride, was 4% the total deposition of chromium was 22 milligrams per square foot. At 12% of ammonium chloride the total deposition of the chromium was 20 milligrams per square foot, and at 32% of ammonium chloride the total deposition of the chromium was 15 milligrams per square foot. The chloride ion also assists in the development of color. Other chlorides which can be employed instead of ammonium chloride are sodium chloride, hydrogen chloride (with due allowance for pH), and potassium chloride and ionizable chlorides which do not precipitate insoluble compounds in the coating solution.

The invention makes it possible to predetermine the quantity of chromium to be deposited on aluminum or an aluminum alloy. In the preferred practice of the invention the fluoboric acid in the coating solution is maintained substantially at a minimum, say, for example, $\frac{1}{2}\%$ by volume of Composition B, and the chromium content of the chromic acid-dichromate solution is varied in accordance with the amount of chromium which it is desired to deposit on the aluminum or the aluminum alloy. Thus, with a fluoboric acid concentration in the coating solution corresponding to $\frac{1}{2}\%$ by volume of Composition B a chromium deposit of at least 20 milligrams per square foot on aluminum or an aluminum alloy can be obtained within a range of chromium concentrations of about 1.1 to about 4.2 grams per liter of coating solution. If it is desired to reduce the chromium deposit to say 12 to 20 milligrams per square foot, the chromium concentration of the coating solution can be reduced as low as 0.5 gram per liter or increased to 5.2 grams per liter. On the other hand, if the fluoboric acid content of the coating solution is increased, the chromium content of the coating solution becomes more critical. In general, the range of chromium content of the coating solution will not be less than 0.5 gram of chromium per liter, nor more than 5.2 grams of chromium per liter and is preferably within the range of about 1.1 to about 3.2 grams of chromium per liter.

The water soluble dichromate employed in the practice of the invention is preferably sodium dichromate but other water soluble dichromates, including potassium dichromate and ammonium dichromate can be employed.

In addition to aluminum and the aluminum alloys previously described, the invention is generally applicable to the treatment of aluminum alloys including die casting alloys such as 13, 43, 85, 218, 360, 380 and 384. The invention is especially useful in producing strong, adherent, corrosion resistant chromium coatings on aluminum alloys containing 0.25 to about 5% by weight of copper alloyed principally with aluminum and containing up to 12% by weight of other elements such as manganese, magnesium, nickel, lead, bismuth, chromium, zinc, iron, tin, and/or silicon.

The invention makes it possible to apply controlled amounts of chromium to aluminum and aluminum alloys and to produce improved and enhanced corrosion resistance and paint receptability.

The preferred products of the invention contain an iridescent yellow to brown coating of distinctive appearance sometimes referred to as "rainbow" because of the varied color effect.

The invention is hereby claimed as follows:

1. A coating composition for aluminum and aluminum alloys consisting essentially of a water soluble dichromate, chromic acid and fluoboric acid dissolved in water in which the chromium content is within the range of 0.5 to 5.2 grams per liter, the pH is within the range of 1.3 to 2.5, the weight ratio of chromium in said dichromate to chromium in said chromic acid being within the range of 10:1 to 1:4, and the mol ratio of $HBF_4$ to $CrO_3$ is within the range of 1:16 to 2:1.

2. A composition as claimed in claim 1 which also contains a minor proportion of an ionizable chloride which does not precipitate insoluble compounds in said solution.

3. A coating composition for aluminum and aluminum alloys consisting essentially of sodium dichromate, chromic acid, fluoboric acid and ammonium chloride dissolved in water at a pH within the range of 1.6 to 2.1, the weight ratio of chromium in the dichromate to chromium in the chromic acid being within the range of 10:1 to 1:4, the mol ratio of $HBF_4$ to $CrO_3$ being within the range of 1:2 to 1:3, and the quantity of ammonium chloride being within the range of 4% to 32% of the total weight of fluoboric acid and ammonium chloride.

4. A process of protectively coating metals which comprise applying to the surface of metals from the class consisting of aluminum and aluminum alloys a coating solution consisting essentially of a water soluble dichromate, chromic acid and fluoboric acid dissolved in water, the chromium content of said solution being within the range of 0.5 to 5.2 grams per liter, the pH being within the range of 1.3 to 2.5, the weight ratio of chromium in said dichromate to chromium in said chromic acid being within the range of 10:1 to 1:4, and the mol ratio of $HBF_4$ to $CrO_3$ being within the range of 1:16 to 2:1.

5. A process as claimed in claim 4 in which the chromium content of said solution is within the range of about 1.1 to about 3.2 grams of chromium per liter of solution.

6. A process as claimed in claim 4 in which the mol ratio of $HBF_4$ to $CrO_3$ is within the range of 1:2 to 1:3.

7. A process as claimed in claim 4 in which said coating solution also contains an ionizable chloride which dissolves in the coating solution without precipitating insoluble compounds.

8. A process as claimed in claim 4 in which said coating solution also contains about 4% to about 32% by weight of ammonium chloride, calculated on the total weight of fluoboric acid and ammonium chloride.

9. A process as claimed in claim 4 in which the pH of the coating solution is within the range of 1.6 to 2.1.

10. A process as claimed in claim 4 in which the pH of the coating solution is maintained during processing within the range of 1.3 to 2.5 by acidifying with nitric acid.

11. A process of protectively coating the surface of an aluminum alloy containing copper which comprises applying to said surface a coating composition consisting essentially of a water soluble dichromate, chromic acid and fluoboric acid dissolved in water, the chromium content of said composition being within the range of 0.5 to 5.2 grams per liter, the pH being within the range of 1.3 to 2.5, the weight ratio of chromium in said dichromate to chromium in said chromic acid being within the range of 10:1 to 1:4, the mol ratio of $HBF_4$ to $CrO_3$ being within the range of 1:16 to 2:1, and said process being conducted under conditions such that 20 to 40 milligrams of chromium per square foot are deposited on the surface of said alloy.

12. A process as claimed in claim 11 in which said aluminum alloy contains 0.25% to about 5% by weight of copper alloyed principally with aluminum and containing up to 12% by weight of at least one element from the group consisting of manganese, magnesium, nickel, lead, bismuth, chromium, zinc, iron, tin and silicon.

References Cited in the file of this patent

UNITED STATES PATENTS

| | | |
|---|---|---|
| 2,114,151 | Romig | Apr. 12, 1938 |
| 2,210,850 | Currin | Aug. 6, 1940 |
| 2,428,749 | DeLong | Oct. 7, 1947 |
| 2,507,956 | Bruno et al. | May 16, 1950 |
| 2,613,165 | Fischer | Oct. 7, 1952 |
| 2,655,439 | Floersch | Oct. 13, 1953 |
| 2,678,291 | Spruance | May 11, 1954 |